United States Patent [19]

Meacham, Jr.

[11] 4,226,267

[45] Oct. 7, 1980

[54] VENDING MACHINE WITH SELF CONTAINED WATER SUPPLY

[75] Inventor: Thomas E. Meacham, Jr., Philadelphia, Pa.

[73] Assignee: Refreshment Machinery Incorporated, Warminster, Pa.

[21] Appl. No.: 937,698

[22] Filed: Aug. 29, 1978

[51] Int. Cl.³ .............................................. B65B 3/26
[52] U.S. Cl. ..................................... 141/18; 137/565; 141/198; 222/56; 417/12; 417/26
[58] Field of Search ................. 141/2, 18, 59, 95, 104, 141/105, 198; 222/56, 70, 136, 144.5, 145, 400.8; 417/12, 26, 27, 290, 442; 137/565

[56] References Cited

U.S. PATENT DOCUMENTS 4,030,634  6/1977  Osborn ............................... 222/56 X

*Primary Examiner*—Frederick R. Schmidt
*Attorney, Agent, or Firm*—Seidel, Gonda, Goldhammer & Panitch

[57] ABSTRACT

A vending machine such as a coffee vending machine has a hot water tank connected to the outlet side of a pump. The inlet side of the pump is selectively connected to one of a plurality of water storage containers by way of a valve. Water for the hot water tank is pumped thereto from the storage containers. When a storage container is empty, the valve is moved to a position so as to communicate with another one of the containers.

7 Claims, 5 Drawing Figures

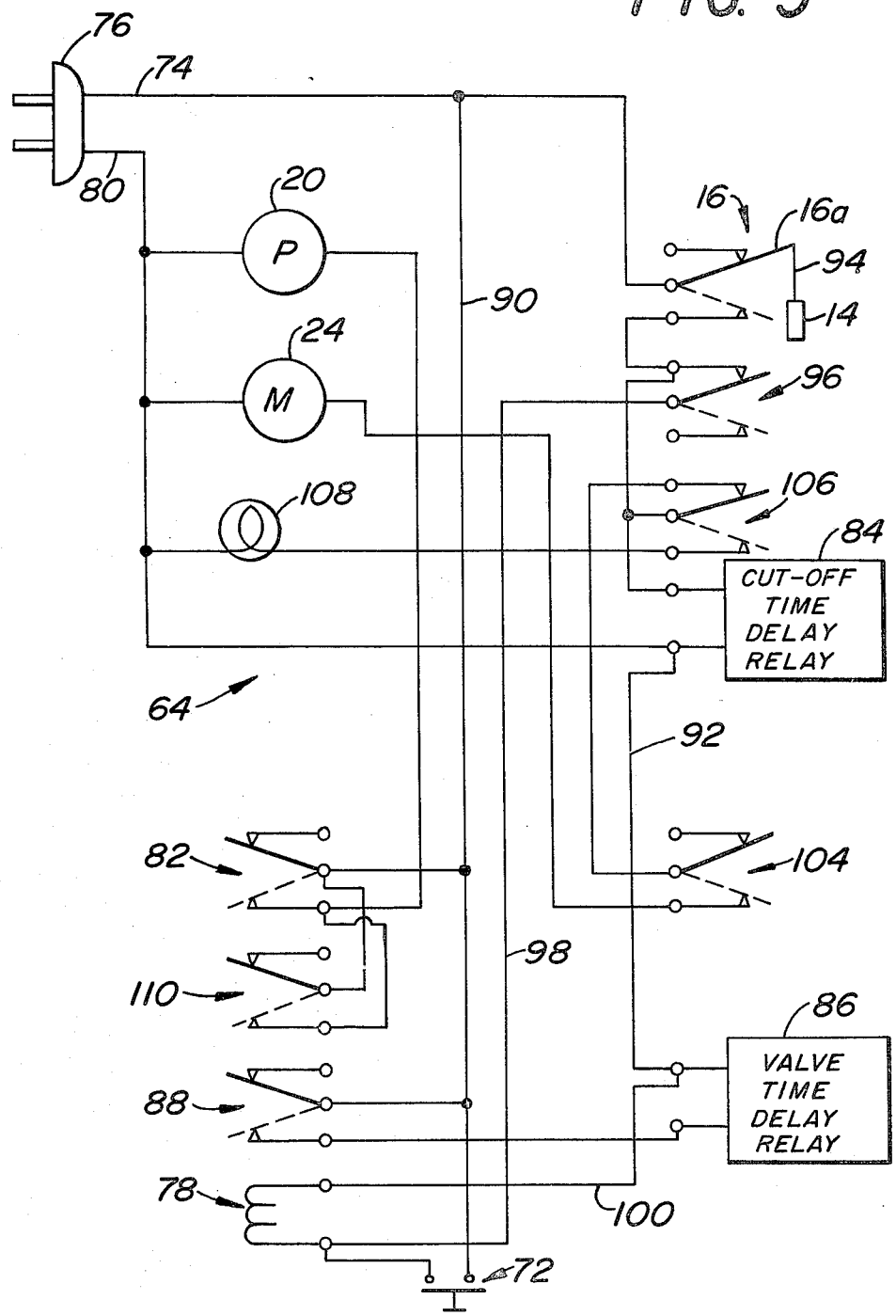

VENDING MACHINE WITH SELF CONTAINED WATER SUPPLY

BACKGROUND

Vending machines which include a water tank, such as a vending machine for dispensing hot coffee or cocoa, are installed so as to be connected to a source of city water. There is a need for vending machine of this nature having a self-contained water supply. Thus, coffee or some other beverage made from pure bottled water has a different flavor as compared with the chlorinated water available from a municipal water supply. A second factor in connection with the need for a system of this nature is that some localities where it is desired to have a system of this nature do not have any municipal water system.

SUMMARY OF THE INVENTION

The present invention is directed to a vending machine with a self-contained water supply system. The vending machine includes a water tank from which water is to be dispensed. A pump has its outlet connected to said tank. The tank has a means for controlling operation of said pump in response to the level of water in said tank. Thus, said pump is operative when the water level in said tank is below a predetermined level.

A plurality of water storage containers are provided. A valve is provided with a plurality of inlets and a single outlet. Each valve inlet is connected to one of said storage containers. The valve outlet is connected to the pump inlet. The valve includes a valve member for selectively controlling flow from said valve inlets to said valve outlet. A motor is connected to the valve member for moving the same.

Circuitry including the valve motor is provided. When water in one storage container is depleted, the valve member is moved by its motor to communicate the pump inlet with another of the storage containers.

It is an object of the present invention to provide a vending machine with a self-contained water supply in a form of a plurality of containers selectively communicated with the vending machine.

It is another object of the present invention to provide a vending machine with a self-contained water supply for use in areas where there is no municipal water supply or the municipal water supply has a high chlorine content in the water.

Another object of the present invention is to provide a vending machine with an automatic self-contained water supply system of a plurality of containers each selectively communicating with the vending machine when water in one container is depleted.

It is another object of the present invention to provide a water supply system for a vending machine which is simple, inexpensive and reliable.

Other objects will appear hereinafter.

For the purpose of illustrating the invention, there is shown in the drawings a form which is presently preferred; it being understood, however, that this invention is not limited to the precise arrangements and instrumentalities shown.

FIG. 5 is a diagrammatic illustration of circuitry used in connection with the apparatus of the present invention.

Figure 1:
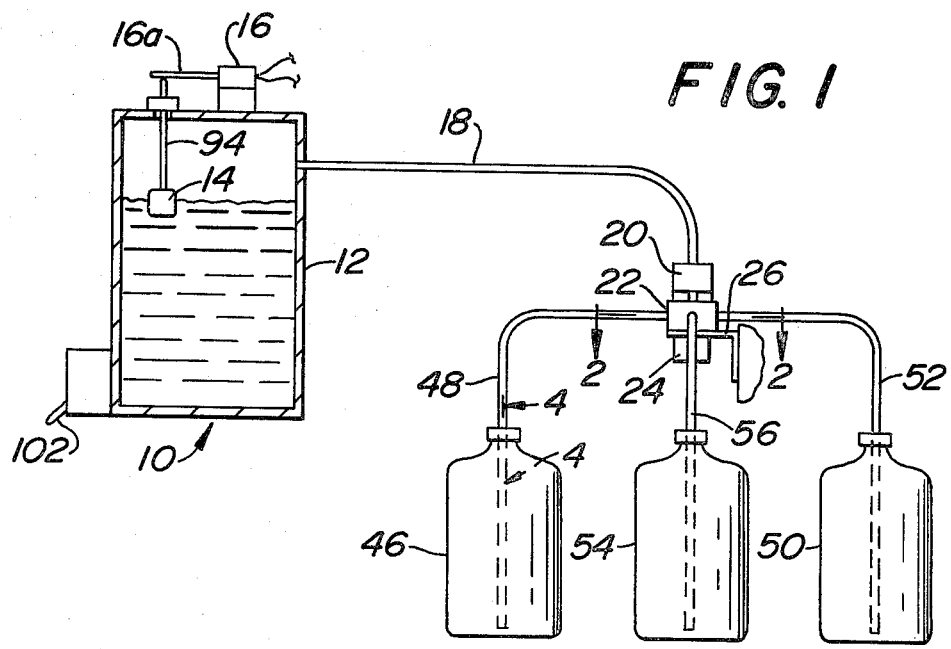
FIG. 1 is a schematic illustration of a vending machine and its water supply.

Referring to the drawings in detail, wherein like numerals indicate like elements, there is shown in FIG. 1 a vending machine designated generally as 10. The vending machine 10 may be any one of a wide variety of coin or pushbutton operated vending machines for vending hot or cold beverages. The machine 10 includes a water tank 12. In order that hot beverages may be dispensed, the tank 12 includes hot water heaters not shown. Within the tank 12, there is provided a float 14. While a float is preferred, a photocell could be used. The float 14 operates a switch 16 in a manner to be described in greater detail hereinafter.

A conduit 18 communicates at one end with the tank 12 adjacent the upper end of the tank 12. The other end of conduit 18 is connected to the outlet side of a pump 20. The inlet side of the pump 20 is connected to the outlet side of a valve 22. The valve 22 includes a motor 24. The pump 20, valve 22, and motor 24 are coupled together as a unit and are supported by a bracket 26. Motor 24 is preferably a fractional horsepower shaded pole motor having an output gear box for reducing the output speed to about 1½ rpm.

Figure 2:
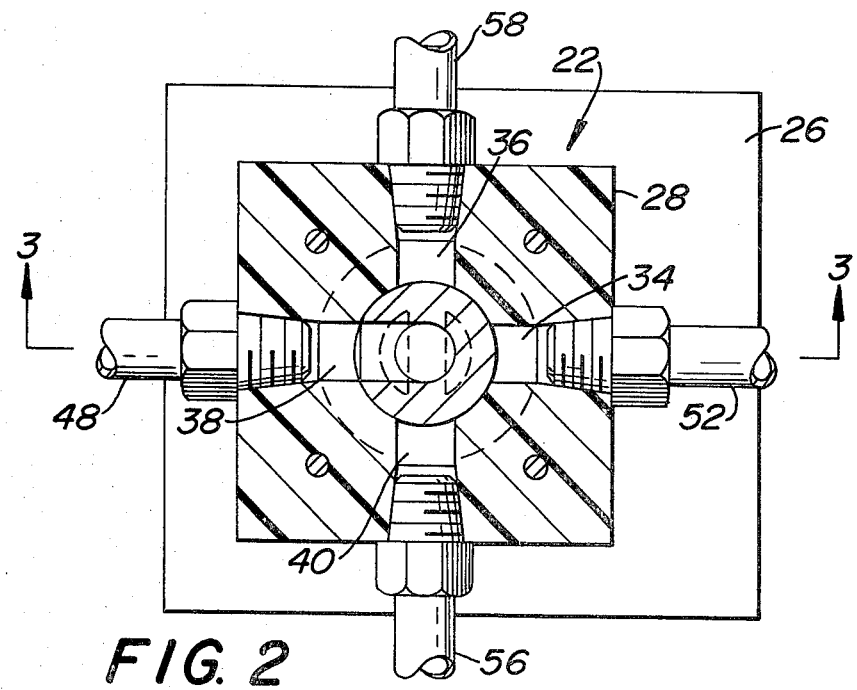
FIG. 2 is a sectional view taken along the line 2—2 in FIG. 1 but on an enlarged scale.
Figure 3:
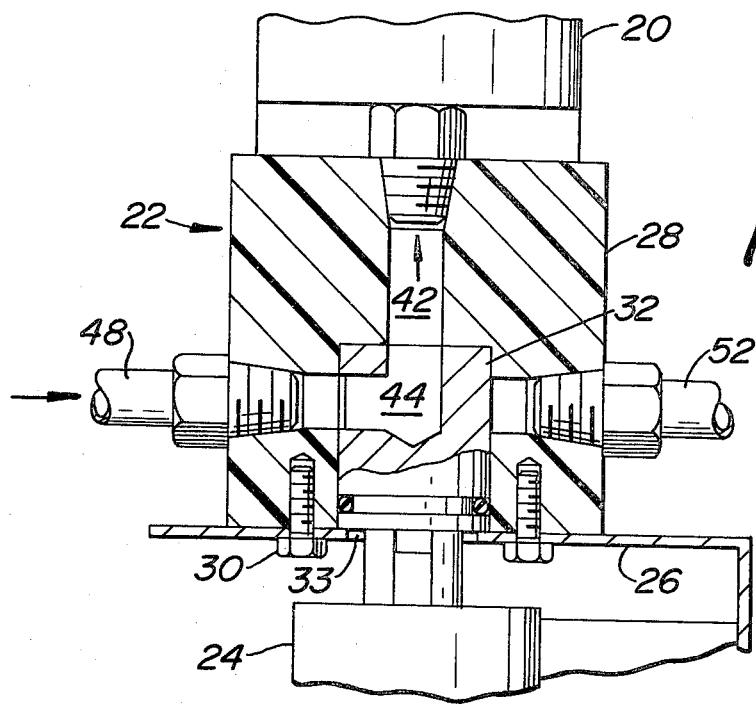
FIG. 3 is a sectional view taken along the line 3—3 in FIG. 2.

As shown more clearly in FIGS. 2 and 3, the valve 22 includes a valve body 28 of generally rectangular shape. Valve body 28 is made from a non-corrosive material and preferably from a polymeric plastic material such as polycarbonate. The valve body 22 is connected to the bracket 26 by way of a plurality of fasteners 30.

Within the valve body 28, there is provided a valve member 32. Valve member 32 is preferably of the rotary plug type. Bracket 26 has a hole 33 whose diameter is smaller than that of valve member 32 and through which extends the connection between motor 24 and valve member 32. Valve member 32 is rotated by motor 24 in a manner to be described hereinafter.

The valve body 28 is of the type to have multiple inlets with a single outlet. Thus, on four faces thereof, the rectangular valve body 28 has an inlet. The inlets are designated 34, 36, 38 and 40. See FIG. 2. Extending upwardly from the valve member 32, there is provided in valve body 28 an outlet 42 which communicates with the inlet side of pump 20. Valve member 32 is provided with a flow passage 44 which selectively communicates outlet 42 with one of the inlets 34, 36, 38 and 40. If desired, valve body 28 could be a hexagon and have six faces or could an octagon with eight side faces.

Referring to FIG. 1, a container 46 communicates with inlet 38 by way of conduit 48. A container 50 communicates with inlet 34 by way of conduit 52. A container 54 communicates with inlet 40 by way of conduit 56. Another container not shown, and directly behind container 54, communicates with inlet 36 by way of conduit 58. Each of the conduits 48, 52, 56 and 58 extends to a location adjacent the bottom of their respective containers.

Figure 4:
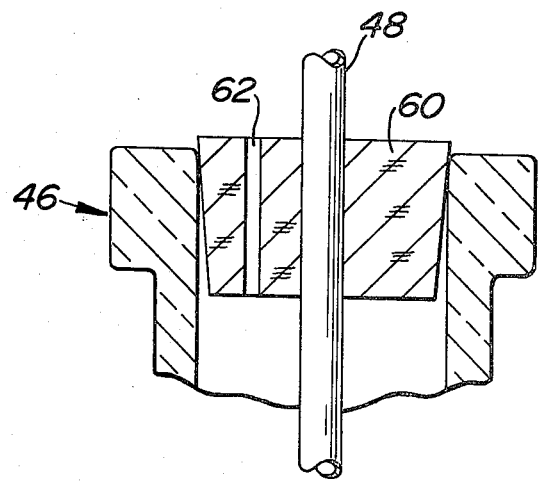
FIG. 4 is a sectional view taken along the line 4—4 in FIG. 1 but on an enlarged scale.

The containers 46, 50 and 54 may be of any convenient size depending upon the expected consumption of the vending machine 10. The preferred containers are commercially available five gallon containers having bottled water therewithin which is neither under pressure nor vacuum. As shown more clearly in FIG. 4, each of the conduits 48, 52 or 56 extends into its associated container by way of a closure 60 having a vent passage 62.

In FIG. 5, there is shown circuitry designated generally as 64 for controlling operation of the elements described above.

Initially, it is presumed that the water supply in tank 12 must be replenished and that each of the containers associated with inlets 34, 36, 38 and 40 has been emptied. As a result, a cut-off time delay relay 84 will cause a switch 106 to close as indicated in phantom in FIG. 5. Operation of the relay 84 and switch 106 is described more particularly below in connection with automatic operation of circuit 64. Switch 106 energizes a warning lamp 108 to indicate that the containers must be refilled. Once the containers are refilled, water is introduced into the tank 12 by operation of the pump 20 in response to depression of a momentary reset push button switch 72. Depression of the push button switch 72 energizes a pump relay coil 78 by completing a circuit from line 74 of outlet plug 76 through switch 72 and relay coil 78 to line 80 of the outlet plug 76. Relay coil 78 closes SPDT switch 82 as indicated in phantom in FIG. 5. This places the pump 20 across the outlet plug lines 74 and 80.

As long as the water in tank 12 is below the desired level, the float 14 does not activate switch 16, and the switch 16 remains in the closed position as indicated in phantom in FIG. 5. In this position, switch 16 permits current to flow from plug 76 through switch 106 to lamp 108. As pump 20 continues to pump water to the tank 12, the water level rises inside the tank and stem 94 of float 14 raises arm 16a of switch 16 to open switch 16. Accordingly, the power to lamp 108 is interrupted and the lamp goes off.

In addition, when float 14 opens switch 16, the circuit to relay coil 78 is broken. Accordingly, switches 82 and 88 open to remove power to pump 20 and the pump 20 stops operating. This completes the initial introduction of water to the desired level in tank 12. Thereafter, water is automatically introduced into tank 12 via conduit 18 and pump 20 to restore the water in the tank to the desired level whenever water is withdrawn from the tank 12 during a typical vending machine cycle.

By automatic operation is meant operation in response to the float 14 and switch 16 without resort to the reset push button 72. Automatic operation under control of the circuit 64 is described hereinafter.

During a typical vending machine cycle, water is withdrawn from tank 12 via a spout 102. As the water level drops to a level based on discharge of about ½ liter of water, float 14 descends and closes switch 16 to the phantom position shown in FIG. 5. Closure of switch 16 causes the pump relay coil 78 to be energized via switch 96 which remains closed until opened by relay 84. Pump relay coil 78 causes switch 82 to close to the phantom position. As a result, pump 20 begins to pump water from one of the containers 46, 50 or 54 to the tank 12 via conduit 18. Closure of switch 16 also causes the cut-off time delay relay 84 to be energized. The cut-off time delay relay 84 is an adjustable electronic time delay relay such as the CLB-51-70120 type manufactured by Potter & Brumfield. The time delay relay 84 will only operate after a delay of 120 seconds following initial energization.

A valve time delay relay 86 of the same type as relay 84 will also be energized at this time since relay coil 78 causes SPDT switch 88 to close as indicated in phantom in FIG. 5. Thus switch 88 completes a circuit from line 74 to line 90 through switch 88 and valve time delay relay 86 to line 92 and line 80. The valve time delay relay 86 is adjusted to operate after a 15 second delay following initial energization.

As the pump 20 pumps water into the tank 12 via conduit 18, the valve member 32 remains stationary. As the tank 12 is replenished, the float 14 rises, stem 94 eventually lifts arm 16a to open switch 16. If switch 16 is not opened within 15 seconds after energization of the valve time delay relay 86, the valve time delay relay operates a SPDT switch 104 causing closure of the switch to the phantom position indicated in FIG. 5. Since switch 16 is still closed, a circuit is completed from line 74 through switch 16 to a SPDT switch 106 and switch 104 to line 80. Accordingly, the valve motor 24 is energized. The valve motor 24 rotates valve member 32 to the next inlet. Assuming that the container associated with the next inlet is not empty, the pump 20 will pump water from the container to tank 12 via conduit 18, and the water in tank 12 will be restored to the desired level. At that time, the switch 16 will be opened by float 14. This de-energizes the relay coil 78 which in turn causes contacts 82 and 88 to open. When contact 82 is open, pump 20 shuts off. When contact 88 is open, the valve conduit relay 86 is de-energized. As a result, switch 104 opens, and valve motor 24 shuts off.

It should be noted that valve motor 24 continuously rotates valve member 32 so that the valve member slowly sweeps past the inlets 34, 36, 38 and 40. The speed at which valve member 32 is rotated by the motor 24, however, is such that the pump 20 supplies enough water (about ½ liter) to restore the water in tank 12 to the desired level from a single container within a period of approximately 3 seconds while it takes about 5 seconds for passage 44 to traverse one of the inlets 34, 36, 38, 40.

If all four containers are empty, the pump 20 will not be able to restore the water in tank 12 to the desired level such that float 14 can cause switch 16 to open. Switch 16, therefore, remains closed while the valve motor 24 rotates valve member 34 as previously described. After 120 seconds, the valve member 32 will have swept past all four inlets 34, 36, 38 and 40. At this time, the cut-off time delay relay, which had previously been energized on closure of switch 16 following a normal vend cycle, operates switches 96 and 106 by causing the switches to assume the positions indicated in phantom in FIG. 5. With switch 96 in the phantom position, pump relay coil 78 is de-energized, and switches 82 and 88 open. Accordingly, pump 20 shuts off and the valve time delay relay 86 is reset. In addition, with switch 106 in the phantom position, the circuit to valve motor 24 through switch 104 is broken, and the valve motor shuts off. At the same time, a circuit is completed from line 74 through switch 16 and switch 106 to warning lamp 108 and line 80. The lamp 108 indicates that the containers 46, 50 and 54 are empty and that the tank 12 must be re-filled.

To initiate a new cycle of operation, the containers are refilled, the reset push button switch 72 is depressed, and pump 20 is operated to replenish the water supply in tank 12 until float 14 opens switch 16 as previously described. When switch 16 opens, the cut-off time delay relay 84 is reset switch 106 opens, and lamp 108 shuts off. Thereafter, operation of the pump 20 and valve motor 24 takes place as described above without any manual intervention.

In the foregoing description of the preferred embodiment, the passive positions of all switches are shown in solid lines. Active positions are shown in phantom. It should be noted that a switch 110 may be coupled in shunt with switch 82, both switches being controlled by relay coil 78, to prevent damage to the switches due to current surges at start-up of pump motor 20.

The present invention may be embodied in other specific forms without departing from the spirit or essential attributes thereof and, accordingly, reference should be made to the appended claims, rather than to the foregoing specification, as indicating the scope of the invention.

I claim:

1. An improvement in a vending machine with a self-contained water supply comprising a vending machine having a water tank from which water is to be dispensed, a pump having its outlet connected to said tank, said tank having a means for controlling operation of said pump in response to the level of water in said tank so that the pump is operative when the water level in said tank is below a predetermined level, a plurality of water storage containers, a valve having a plurality of inlets and a single outlet, said valve outlet being connected to the inlet side of said pump, each valve inlet being connected to one of said storage containers, said valve including a valve member for selectively controlling flow from said inlets to said valve outlet, a motor connected to said valve member, circuitry interconnecting said valve motor and said pump with said liquid level responsive means so that when water in one storage container is depleted, the valve member is moved by said motor to communicate said pump inlet with another of said containers.

2. Apparatus in accordance with claim 1 wherein said circuitry includes a delay means for delaying actuation of the valve member by its motor subsequent to initiating operation of said pump.

3. Apparatus in accordance with claim 1 wherein said valve member is a rotary valve member, said motor being coupled to said valve member to rotate said valve member about its longitudinal axis until the motor is rendered inoperative by said liquid level responsive means.

4. Apparatus in accordance with claim 1 including a common support for said pump, valve and valve motor, said pump being connected to the upper end of said valve and said motor being connected to the lower end of said valve.

5. Apparatus in accordance with claim 1 wherein said circuitry includes a manually operable pushbutton for initiating operation of said pump to initially fill said tank.

6. Apparatus in accordance with claim 1 wherein said circuitry includes means for rendering said pump and motor inoperative unless said tank is filled within a predetermined number of seconds subsequent to the initiation of the operation of said pump.

7. Apparatus in accordance with claim 1 wherein said valve has four inlets each on a different side face thereof with said outlet being on an end face of the valve.

* * * * *